United States Patent
Whitlock et al.

(10) Patent No.: US 12,304,633 B2
(45) Date of Patent: May 20, 2025

(54) EMERGENCY EGRESS IN A BLENDED WING BODY AIRCRAFT

(71) Applicant: JETZERO, INC., Long Beach, CA (US)

(72) Inventors: Jennifer Whitlock, Zionsville, IN (US); Brendan Kennelly, Fullerton, CA (US); Mark Allan Page, Orange, CA (US)

(73) Assignee: JetZero, Inc., Long Beach, CA (US)

(*) Notice: Subject to any disclaimer, the term of this patent is extended or adjusted under 35 U.S.C. 154(b) by 0 days.

(21) Appl. No.: 18/144,601

(22) Filed: May 8, 2023

(65) Prior Publication Data
US 2023/0406504 A1 Dec. 21, 2023

Related U.S. Application Data

(63) Continuation of application No. 16/726,765, filed on Dec. 24, 2019, now Pat. No. 11,697,500.
(Continued)

(51) Int. Cl.
*B64D 11/00* (2006.01)
*B64C 1/10* (2006.01)
(Continued)

(52) U.S. Cl.
CPC ............... *B64D 11/00* (2013.01); *B64C 1/10* (2013.01); *B64C 1/1423* (2013.01); *B64C 1/22* (2013.01);
(Continued)

(58) Field of Classification Search
CPC .......... B64D 11/00; B64D 25/14; B64C 1/10; B64C 1/1423; B64C 1/22; B64C 39/00; B64C 39/10; B64C 2039/105
See application file for complete search history.

(56) References Cited

U.S. PATENT DOCUMENTS 6,122,789 A * 9/2000 Stephenson ........... B64F 1/3055
14/71.1
6,497,389 B1 * 12/2002 Rawdon ................. B64D 25/00
244/140
(Continued)

FOREIGN PATENT DOCUMENTS

CN 101693468 A * 4/2010 ............... B60F 3/00
EP 3263457 A1 * 1/2018 ............... B64C 1/00
(Continued)

OTHER PUBLICATIONS

Z. Van der voet et al., "Configuration of the Multibubble Pressure Cabin in Blended Wing Body Aircraft", 2012.*
(Continued)

*Primary Examiner* — Assres H Woldemaryam
(74) *Attorney, Agent, or Firm* — Caldwell Intellectual Property Law

(57) ABSTRACT

Technologies for providing emergency egress routes for a blended wing body aircraft are described herein. In some examples, the emergency egress routes are through a side cabin bulkhead and aft one or more cargo holds. In some examples, the blended wing body aircraft has wings that are high geometry wings. In these examples, the emergency egress routes do not penetrate an aft spar, reducing weight and increasing the integrity of the aircraft.

18 Claims, 2 Drawing Sheets

Related U.S. Application Data

(60) Provisional application No. 62/786,615, filed on Dec. 31, 2018.

(51) Int. Cl.
  *B64C 1/14* (2006.01)
  *B64C 1/22* (2006.01)
  *B64C 39/00* (2023.01)
  *B64C 39/10* (2006.01)
  *B64D 25/14* (2006.01)

(52) U.S. Cl.
  CPC .............. *B64C 39/00* (2013.01); *B64C 39/10* (2013.01); *B64D 25/14* (2013.01); *B64C 2039/105* (2013.01)

(56) References Cited

U.S. PATENT DOCUMENTS

| | | | |
|---|---|---|---|
| 10,407,151 B2* | 9/2019 | Cazals | B64C 1/1423 |
| 2002/0003190 A1 | 1/2002 | Sankrithi et al. | |
| 2002/0063187 A1 | 5/2002 | Depeige et al. | |
| 2003/0108412 A1* | 6/2003 | Zimmer | A61G 3/02 |
| | | | 414/522 |
| 2003/0213870 A1* | 11/2003 | Eakins | B64C 1/0009 |
| | | | 244/119 |
| 2005/0218263 A1* | 10/2005 | Udall | B64C 25/001 |
| | | | 244/102 R |
| 2009/0261200 A1* | 10/2009 | Saint-Jalmes | B64D 11/04 |
| | | | 244/118.5 |
| 2010/0243814 A1* | 9/2010 | Anger | B64D 25/08 |
| | | | 182/20 |
| 2011/0133021 A1* | 6/2011 | Lugg | B64C 30/00 |
| | | | 244/13 |
| 2013/0099053 A1* | 4/2013 | Barmichev | B64D 11/06 |
| | | | 244/65 |
| 2013/0119198 A1* | 5/2013 | Campbell | B64C 1/00 |
| | | | 156/79 |
| 2014/0175215 A1* | 6/2014 | Gallant | B64F 1/30 |
| | | | 244/36 |
| 2018/0334254 A1* | 11/2018 | Saint-Marc | B64D 11/003 |
| 2019/0039712 A1* | 2/2019 | Moore | B64C 1/1423 |
| 2020/0207463 A1* | 7/2020 | Schuster | B64C 25/40 |

FOREIGN PATENT DOCUMENTS

| | | | | |
|---|---|---|---|---|
| FR | 2929244 A1 * | 10/2009 | ............. | B64D 11/04 |
| WO | WO-2013125218 A1 * | 8/2013 | ............... | B64C 1/20 |
| WO | WO-2015127903 A1 * | 9/2015 | ......... | B64C 29/0033 |
| WO | WO-2016016027 A1 * | 2/2016 | ......... | B64D 11/0605 |

OTHER PUBLICATIONS

Liebeck; (doc."Design of the Blended Wing Body Subsonic Transport") , p. 19, Feb. 2004.

\* cited by examiner

EMERGENCY EGRESS IN A BLENDED WING BODY AIRCRAFT

CROSS-REFERENCE TO RELATED APPLICATIONS

This application is a continuation of Non-provisional application Ser. No. 16/726,765 filed on Dec. 24, 2019, and entitled "EMERGENCY EGRESS IN A BLENDED WING BODY AIRCRAFT," the entirety of which is incorporated herein by reference, which claims the benefit of priority of U.S. Provisional Patent Application Ser. No. 62/786,615, filed on Dec. 31, 2018, and titled "EMERGENCY EGRESS IN A BLENDED WING BODY AIRCRAFT," each of which are incorporated by reference herein in their entirety.

FIELD OF THE INVENTION

The present invention generally relates to the field of aircraft. In particular, the present invention is directed to emergency egress in a blended wing body aircraft.

BACKGROUND

Conventional aircraft consist essentially of a wing section and a fuselage. This so-called "tube and wing" configuration enables convenient packaging of passengers and cargo, but has certain drawbacks. In most cases, passengers are seated on a deck disposed approximately on the vertical centerline of the fuselage, while cargo is stowed beneath. This enables a relatively wide, flat floor for seats and separates cargo operations from passenger loading and unloading. Passengers can be loaded via one or more passenger doors, while cargo can be loaded from one or more cargo hatches on the underside or sides of the fuselage. This configuration also provides a relative constant fuselage cross section (less the nose and tail cones), enabling a substantial percentage of the available volume of the fuselage to be utilized.

As in other airplane types, emergency egress is an important consideration for a blended wing body ("BWB") aircraft. In a BWB configuration, both the fuselage and the wing provide lift. As the name implies, the blended wing blends the wing and fuselage together to provide a single, lift-producing body. In this configuration, the fuselage serves to both carry passengers and/or cargo and to provide a significant portion of the lift. As a result, the wing portion can be smaller for a given payload. Thus, blended wing aircraft tend to have significantly lower overall drag and can carry larger payloads while consuming less fuel.

When designing BWB aircraft, one of the most important design considerations are emergency egress routes. Emergency egress routes are one or more routes by which passengers and crew take to escape from the aircraft. In conventional BWB aircraft, emergency egress routes can be difficult to establish because of various structural limitations. For example, fuel tank locations located across sidewalls of a main cabin can be problematic. In these instances, conventional BWB aircraft may have egress routes added through a rear-spar/aft-bulkhead. This may cut away, or reduce, important shear structure and may add lengthy tunnels from the bulkhead to a trailing edge. An additional problem with this scheme may be the height of the trailing edge route from the ground for both gear up and gear down landings. Exit routes that open beneath the airplane needed an airbag or other solution to raise the aft end for gear down landings. All of this may add weight, cost, and complexity.

SUMMARY OF THE DISCLOSURE

In an aspect, a blended wing body (BWB) aircraft is described. The BWB aircraft includes a main cabin configured to hold a plurality of rows of seats configured to accommodate passengers during flight, at least one cargo hold located outboard of the main cabin, and at least one egress route aft of the plurality of rows of seats through a side cabin bulkhead, wherein the side cabin bulkhead is located forward of and adjacent to a rear spar of the BWB aircraft.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Examples of the present disclosure related generally to providing for emergency egress routes in a BWB aircraft. In some examples of the presently disclosed subject matter, the egress routes provide a lighter exit scheme over conventional BWB aircraft and can reduce the amount of internal (cabin) volume than what would be required in a conventional rear ramp approach.

As briefly noted above, conventional BWB aircraft may have egress routes that penetrate a rear spar of the BWB aircraft. Often, this increases the weight of the aircraft, as the penetration through the rear spar has to be bolstered with support systems, such as additional material, to ensure a stable spar capable of providing the support required of the rear spar.

In various examples of the presently disclosed subject matter, the BWB aircraft includes cargo holds that are located outboard of a main cabin of the BWB aircraft. The BWB aircraft has one or more egress routes through a side cabin bulkhead behind the cargo holds without perforating or penetrating a rear spar 120 of the BWB aircraft. In some examples, this configuration exploits the geometry of a single deck BWB with cargo holds outboard of the main cabins. The egress route can be through the side cabin bulkheads just behind the cargo holds. The lateral exit exploits high wing geometry to shorten the exit tunnel considerably. Further, the egress routes do not perforate the critical rear-spar/aft-bulkhead 120.

In some examples, there are 2 exits doors for each exit route. One is between the main cabin and cargo hold. The second is at the tunnel exit on the outer lower surface of the wing with an incline suitable for passenger travel, such as roughly 35 degrees included up from the ground facing outward. The exit route is fully in front the of the rear-spar/aft-bulkhead and exits the lower surface a few above ground level for gear-up and about 5 feet above ground level for gear extended. The outer door can serve as a ramp as well or inflatable slides can be used to bridge the gap between the exit and ground. The benefit can be a much lighter exit scheme that requires dramatically less internal volume than a rear ramp approach.

Figure 1:
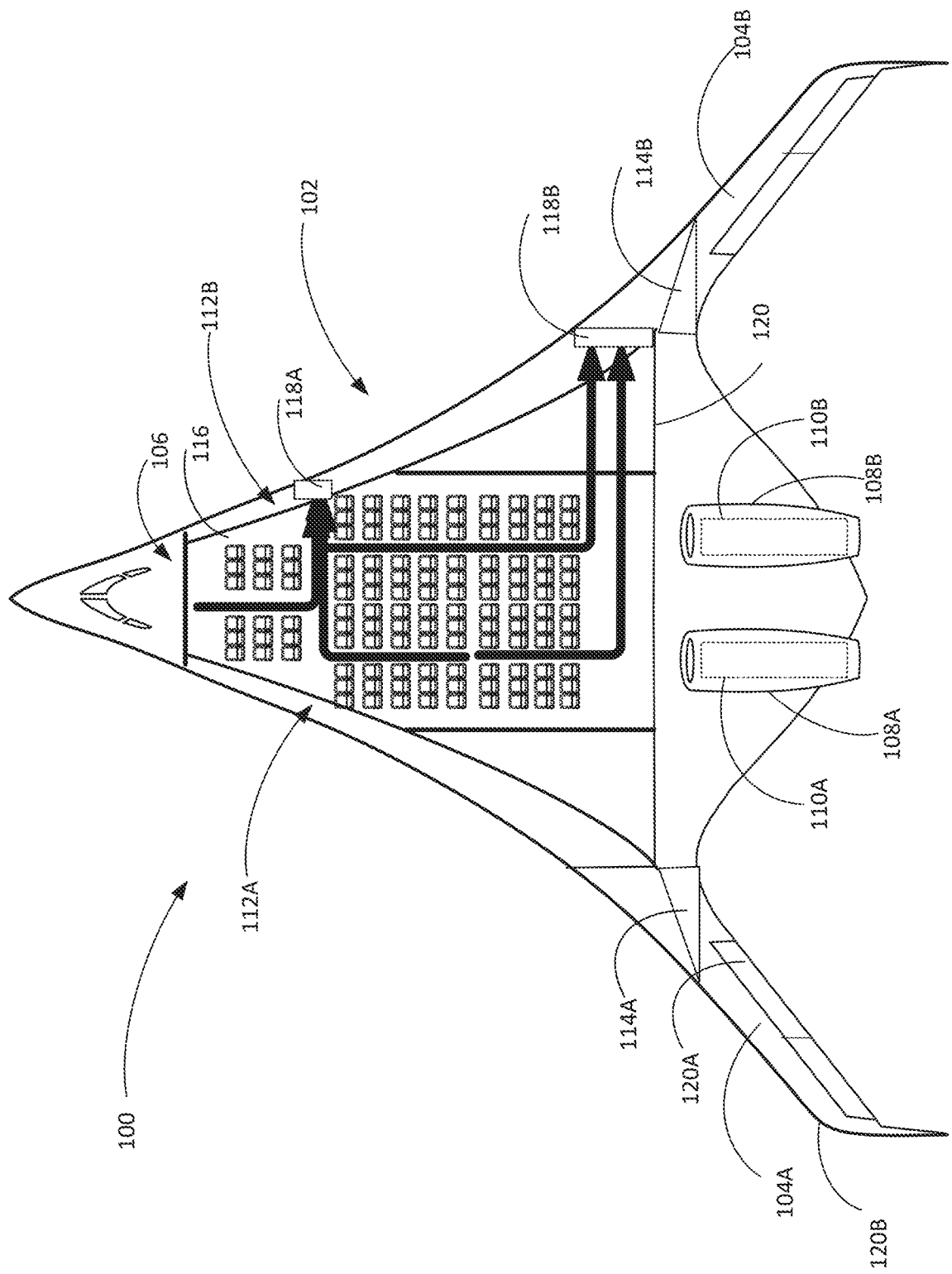
FIG. 1 is a top-down view illustration of a BWB aircraft having multiple egress routes, according to some examples disclosed herein.

FIG. 1 is a top-down view illustration of a BWB aircraft 100 having multiple egress routes, according to some examples disclosed herein. As illustrated in FIG. 1, the BWB aircraft 100 includes a fuselage 102. The fuselage 102 includes a port wing 104A and a starboard wing 104B that are continuously coupled to a nose section 106 of the BWB aircraft 100. The fuselage 102 and wings 104A and 104B are each illustrated to have positive sweep angles. The BWB aircraft 100 further includes nacelle 108A that houses port main engine 110A and nacelle 108B that houses starboard main engine 110B. The BWB aircraft of FIG. 1 is a single deck BWB aircraft configuration, though various examples of the presently disclosed subject matter can be used with different BWB aircraft having more than one deck.

The BWB aircraft 100 includes a port cargo hold 112A and a starboard cargo hold 112B. In some examples, the cargo holds 112A and 112B are pressurized cargo holds designed to hold passenger cargo (suitcases and the like) as well as, in some examples, animal transport. The BWB aircraft 100 further includes port fuel tank 114A and starboard fuel tank 114B. It should be noted that the size and location of various structures, such as the cargo holds 112A and 112B, as well as the fuel tanks 114A and 114B are illustrated merely as an example, as other sizes, locations, and configurations may be used and are considered to be within the scope of the presently disclosed subject matter.

As shown in FIG. 1, there are multiple egress routes, generally indicated by arrows through the main cabin 116 of the BWB aircraft 110. Emergency egress routes are a part of the design of passenger carrying aircraft. The emergency egress routes are to provide for safe passage out of the main cabin 116 to the outside in case of an emergency. Although dependent on aircraft design, it is preferable to have at least two routes by which passengers can egress the BWB aircraft 100 through an exit to the outside of the BWB aircraft 100. As illustrated, the BWB aircraft 100 includes exits 118A and 118B designed as exits for the emergency egress routes. It should be noted that exits 118A and 118B, as well as other exits not illustrated in FIG. 1, can be used in normal operations as exits for the BWB aircraft 100. The exits 118A and 118B are not required to be used exclusively as emergency exits, though the exit 118A and/or 118B can be designed to be used exclusively as an emergency exit.

Figure 2:
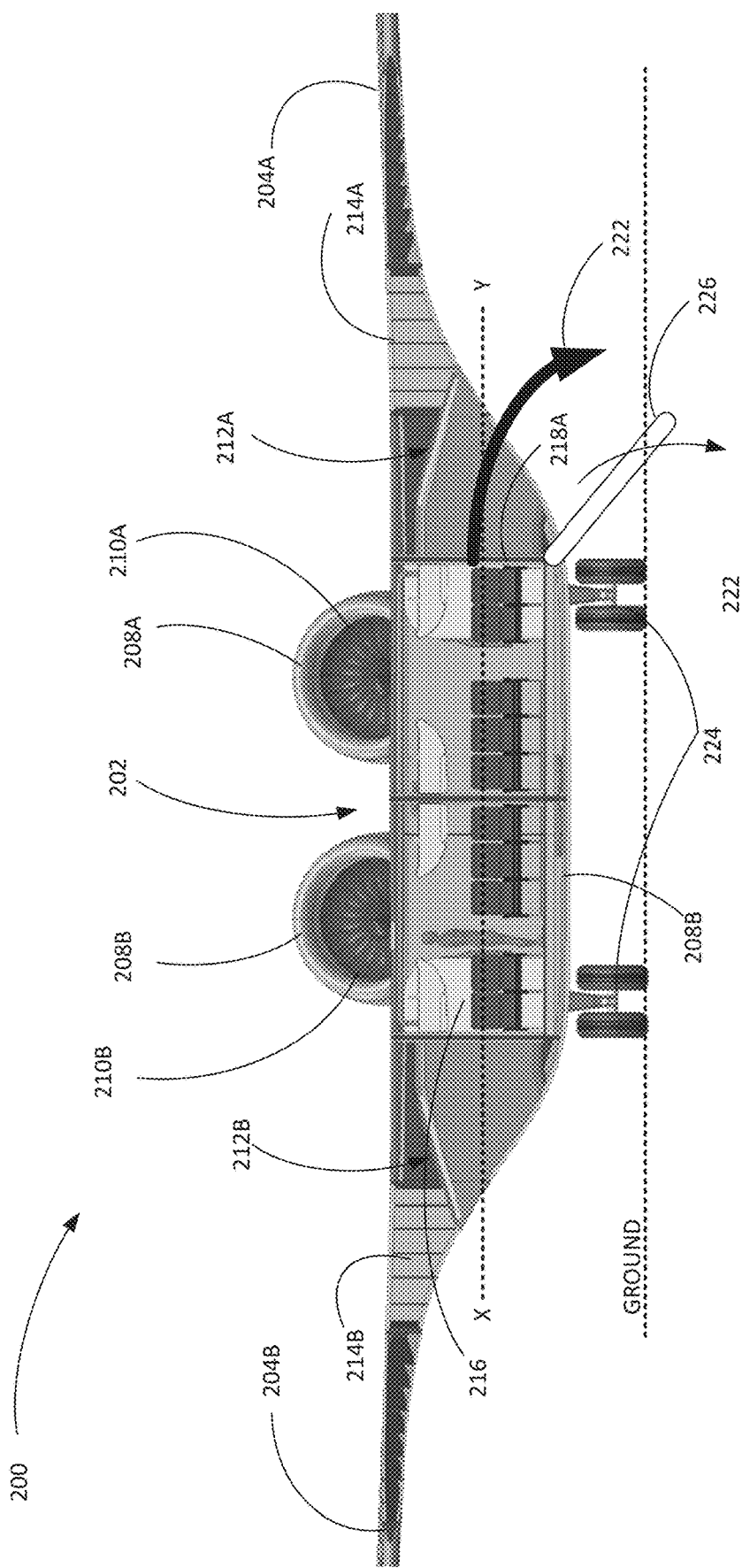
FIG. 2 is a front view illustration of a BWB aircraft having multiple egress routes, according to some examples disclosed herein.

FIG. 2 is a front-view illustration of a main cabin of a BWB aircraft 200 having a high wing geometry. Shown in FIG. 2 is the BWB aircraft 200 with a fuselage 202. The fuselage 202 includes a port wing 204A and a starboard wing 204B. The fuselage 202 and wings 204A and 204B are each illustrated to have positive sweep angles. The BWB aircraft 200 further includes nacelle 208A that houses port main engine 210A and nacelle 208B that houses starboard main engine 210B. The BWB aircraft 200 of FIG. 2 is a single deck BWB aircraft configuration, though various examples of the presently disclosed subject matter can be used with different BWB aircraft having more than one deck.

The BWB aircraft 100 includes a port cargo hold 212A and a starboard cargo hold 212B. In some examples, the cargo holds 212A and 212B are pressurized cargo holds designed to hold passenger cargo (suitcases and the like) as well as, in some examples, animal transport. The BWB aircraft 100 further includes port fuel tank 214A and starboard fuel tank 214B. It should be noted that the size and location of various structures, such as the cargo holds 212A and 212B, as well as the fuel tanks 214A and 214B are illustrated merely as an example, as other sizes, locations, and configurations may be used and are considered to be within the scope of the presently disclosed subject matter.

The BWB aircraft 200 includes exit 218A, which may be used as an emergency egress route. The BWB aircraft may include other exits, as in FIG. 1, that are not illustrated in FIG. 2. As illustrated, the BWB aircraft 200 is a single-deck (i.e. single passenger floor) BWB-type of aircraft. Further, the BWB aircraft 200 has a high wing geometry, illustrated by wings 204A and 204B above centerline XY, which is approximately the center of the height of the BWB aircraft 200 above the floor 220 of the BWB aircraft 200.

The high wing geometry and the location of the exit 218A may exit the length of an exit tunnel significantly. In low wing geometry BWB aircraft, one in which the wing is at or near the centerline XY, one or more of the exits from the aircraft may necessary go through at least a part, if not completely through, a wing of the BWB aircraft. The need to go through the wing of a low wing geometry BWB aircraft can increase the length of travel from a main cabin of the low wing geometry BWB aircraft to the outside, as the passenger needs to travel at least partially through the wing.

In FIG. 2, the BWB aircraft 200 has a high wing geometry, which in some examples significantly shortens the length of travel from the cabin 216 to the outside because the passenger does not need to travel through the wing, as it is above an egress path 222. Further, using a high wing geometry configuration, the egress path 222 is closer to the ground. In some examples, with landing gear 224 up (raised or within the fuselage 202 of the BWB aircraft 200), the egress path 222 may be near ground level. With the landing gear 224 down (lowered or below the fuselage 202 of the BWB aircraft 200), the egress path 222 may be 5 or 6 feet above the ground (the height of the landing gear 224). In some examples, an exit door 226 may be configured to provide a ramp to assist passengers in exiting the BWB aircraft 200. The exit door 226, or another structure of the BWB aircraft 200, may also include an inflatable slide (not illustrated).

While several possible embodiments are disclosed above, embodiments of the present invention are not so limited. For instance, while several possible configurations of hydraulic cylinders, linear actuators, valves, and motors, other suitable actuators and controls could be selected without departing from the spirit of embodiments of the invention. In addition, the location and configuration used for various features of embodiments of the present disclosure can be varied according to a particular aircraft, airport, or landing gear design that requires a slight variation due to, for example, size or weight constraints, runway length, aircraft type, or other factors. Such changes are intended to be embraced within the scope of the invention.

The specific configurations, choice of materials, and the size and shape of various elements can be varied according to particular design specifications or constraints requiring a device, system, or method constructed according to the principles of the invention. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. A blended wing body (BWB) aircraft comprising:
    a main cabin configured to hold a plurality of rows of seats configured to accommodate passengers during flight;
    at least one cargo hold located outboard of the main cabin; and
    at least one egress route aft of the plurality of rows of seats through a side cabin bulkhead comprising:
        a first exit door located between the main cabin and a cargo hold; and
        a second exit door at a tunnel exit, wherein;
            the second exit door is configured to serve as a ramp; and wherein the second exit door is at an end of a shortened exit path;
            the second door is beneath at least a wing of the BWB aircraft;
    wherein the side cabin bulkhead is located forward of and adjacent to a rear spar of the BWB aircraft.

2. The BWB aircraft of claim 1, wherein the side cabin bulkhead is located aft of the at least one cargo hold.

3. The BWB aircraft of claim 1, wherein at least a portion of the side cabin bulkhead is located forward of a trailing edge of at least a wing.

4. The BWB aircraft of claim 1, wherein the at least one egress route does not penetrate the rear spar of the aircraft.

5. The BWB aircraft of claim 1, further comprising:
    a port wing;
    a starboard wing; and
    a nose section, wherein the port wing and the starboard wing are continuously coupled to the nose section.

6. The BWB aircraft of claim 1, wherein the at least one cargo hold located outboard of the main cabin comprises a port cargo hold and a starboard cargo hold.

7. The BWB aircraft of claim 6, wherein each of the port cargo hold and the starboard cargo hold are pressurized cargo holds configured to hold passenger cargo.

8. The BWB aircraft of claim 1, further comprising landing gear.

9. The BWB aircraft of claim 8, wherein at least one egress route aft of the plurality of rows of seats through the side cabin bulkhead comprises:
    a first egress route aft of the plurality of rows of seats through the side cabin bulkhead; and
    a second egress route located 5 to 6 feet above a ground when the landing gear is down.

10. The BWB aircraft of claim 1, wherein the second exit door comprises an inflatable slide.

11. The BWB aircraft of claim 1, wherein the BWB aircraft has the high wing geometry.

12. The BWB aircraft of claim 1, further comprising:
    a port wing;
    a starboard wing, wherein the port wing and the starboard wing are located above a centerline of the BWB aircraft.

13. The BWB aircraft of claim 12, wherein the centerline of the BWB aircraft is a center of a height of the BWB aircraft above a floor of the BWB aircraft.

14. The BWB aircraft of claim 1, wherein the BWB aircraft is a single-deck aircraft.

15. The BWB aircraft of claim 1, wherein the at least one egress route aft of the plurality of rows of seats through the side cabin bulkhead further comprises a second exit door at a tunnel exit on an outer lower surface of a wing.

16. The BWB aircraft of claim 15, wherein the tunnel exit comprises an incline of 35 degrees going up from a ground.

17. The BWB aircraft of claim 1, further comprising:
    a port main engine; and
    a starboard main engine.

18. The BWB aircraft of claim 17, wherein each of the port main engine and the starboard main engine are housed within a nacelle.

* * * * *